(12) United States Patent
Smith

(10) Patent No.: US 12,551,722 B2
(45) Date of Patent: Feb. 17, 2026

(54) MULTI-LEAF COLLIMATOR VISION SYSTEM

(71) Applicant: Elekta Limited, Crawley (GB)

(72) Inventor: Adrian Smith, Crawley (GB)

(73) Assignee: Elekta Limited, Crawley (GB)

( * ) Notice: Subject to any disclaimer, the term of this patent is extended or adjusted under 35 U.S.C. 154(b) by 264 days.

(21) Appl. No.: 18/302,941

(22) Filed: Apr. 19, 2023

(65) Prior Publication Data

US 2023/0330435 A1 Oct. 19, 2023

(30) Foreign Application Priority Data

Apr. 19, 2022 (GB) .................................... 2205671

(51) Int. Cl.
*A61N 5/10* (2006.01)
*G21K 1/04* (2006.01)

(52) U.S. Cl.
CPC ......... *A61N 5/1045* (2013.01); *A61N 5/1048* (2013.01); *G21K 1/046* (2013.01)

(58) Field of Classification Search
None
See application file for complete search history.

(56) References Cited

U.S. PATENT DOCUMENTS

| | | | | |
|---|---|---|---|---|
| 4,323,055 A | * | 4/1982 | Kubiatowicz | G21G 4/08 424/1.61 |
| 2007/0055090 A1 | * | 3/2007 | Neustadter | A61N 5/1049 600/3 |
| 2009/0196401 A1 | * | 8/2009 | Awan | A61N 5/1049 378/150 |
| 2016/0256713 A1 | * | 9/2016 | Saunders | A61N 5/1049 |
| 2021/0015441 A1 | * | 1/2021 | Bourne | A61N 5/1075 |
| 2022/0280813 A1 | * | 9/2022 | Flint | G06Q 10/04 |
| 2023/0085445 A1 | * | 3/2023 | Brown | A61N 5/1049 378/119 |
| 2023/0211076 A1 | * | 7/2023 | Weber | A61N 1/3787 604/891.1 |

FOREIGN PATENT DOCUMENTS

| | | |
|---|---|---|
| GB | 2457072 A | 8/2009 |
| GB | 2582588 A | 9/2020 |
| WO | WO-2021199656 A1 | 10/2021 |

OTHER PUBLICATIONS

"United Kingdom Application Serial No. 2205671.7, Examination Report dated Sep. 29, 2022", (Sep. 29, 2022), 1 pg.

\* cited by examiner

*Primary Examiner* — Marcus H Taningco
(74) *Attorney, Agent, or Firm* — Schwegman Lundberg & Woessner, P.A.

(57) ABSTRACT

A multi-leaf collimator can comprise two banks of leaves facing each other across the radiation field, and an actuation member or actuation means configured to control the location of each leaf, for example, to control the degree to which each leaf is extended into the radiation field. The leaves of the multi-leaf collimator can comprise at least one radioluminescent marker that can emit illumination light, which can be used to accurately determine the position of the leaves.

15 Claims, 3 Drawing Sheets

MULTI-LEAF COLLIMATOR VISION SYSTEM

CLAIM FOR PRIORITY

This application claims the benefit of priority of British Application Number 2205671.7, filed Apr. 19, 2022, which is hereby incorporated by reference in its entirety.

FIELD OF THE INVENTION

The present disclosure relates to a multi-leaf collimator vision system and, in particular, to a system of imaging individual leaves of a multi-leaf collimator.

BACKGROUND

Radiotherapy involves the production of a beam of ionising radiation, usually x-rays or a beam of electrons or other sub-atomic particles. This is directed towards a cancerous region of a patient, and adversely affects the tumour cells causing an alleviation of the patient's symptoms. The beam is delimited so that the radiation dose is maximised in the tumour cells and minimised in healthy cells of the patient, as this improves the efficiency of treatment and reduces the side effects suffered by a patient.

In a radiotherapy apparatus the beam can be delimited using a beam limiting device such as a 'multi-leaf collimator' (MLC). This is a collimator with a large number of elongate thin leaves arranged side to side in an array. Each leaf is moveable longitudinally so that its tip can be extended into or withdrawn from the radiation field. The array of leaf tips can thus be positioned so as to define a variable edge to the collimator. All the leaves can be withdrawn to open the radiation field, or all the leaves can be extended so as to close it down. Alternatively, some leaves can be withdrawn and some extended so as to define any desired shape, within operational limits. A multi-leaf collimator may consist of two banks of such arrays, each bank projecting into the radiation field from opposite sides of the collimator.

Accurately knowing the position of each leaf is particularly important in the field of radiotherapy, where it is imperative to know the characteristics of the dose of radiation delivered to a patient. Presently approaches to the problem of accurate leaf positional readout include complex vision systems and the use of fluorescent markers.

BRIEF DESCRIPTION OF THE DRAWINGS

Specific embodiments are described below by way of example only and with reference to the accompanying drawings in which.

Aspects and features of the present disclosure are set out in the accompanying claims.

DETAILED DESCRIPTION OF THE EMBODIMENTS

An MLC can comprise two banks of leaves facing each other across the radiation field, and an actuation member or actuation means configured to control the location of each leaf, and in particular to control the degree to which each leaf is extended into the radiation field.

The actuation means or member may comprise one or more leaf guides or rails, upon which a bank of leaves is mounted and the entire bank of leaves may be moved into or out from the radiation field to the same degree, as well as means such as lead screws for individually actuating each leaf. The action of the actuation member control the position of each leaf.

Figure 1:
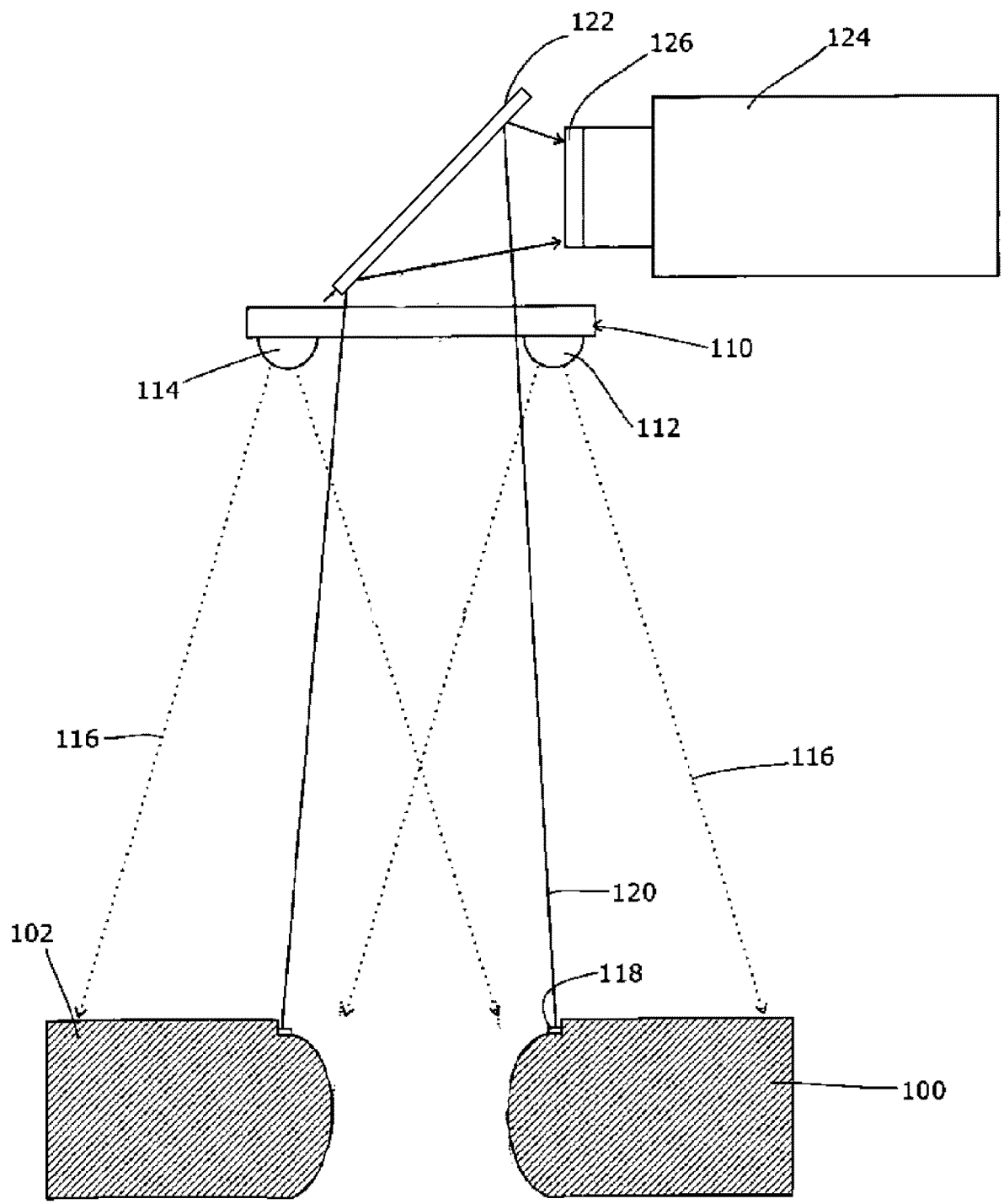
FIG. 1 shows an example of a radiation head according to a known arrangement.

Accurately knowing the position of each leaf is particularly important in the field of radiotherapy, where it is imperative to know the characteristics of the dose of radiation delivered to a patient. One example of a positional sensor is fluorescent markers. FIG. 1 is a schematic cross-section showing an example of a known arrangement. For simplicity of illustration, some mirrors have been omitted, so straight paths for some of the optical systems are shown. The radiation source has also been omitted from FIG. 1. A fluorescing marker 118 is one that accepts incident light energy and emits light at a different wavelength (or frequency). This differs from simple reflection or retro-reflection, in which the reflected light is of substantially the same wavelength as that which was incident.

The MLC leaves 100, 102 are illuminated by a light source 110. Each leaf 100, 102 has a fluorescing marker 118 at its tip. The fluorescing markers 118 are sometimes positioned at the tail end of the leaf. The tail end is the opposite longitudinal end of the leaf to the tip.

Fluorescing markers 118 include ruby markers 118. These ruby markers 118 move as the leaves 110, 102 are moved. Fiducial markers (not shown) are also placed at set positions on the MLC apparatus. The fiducial markers are not placed on leaves 100, 102 and do not move as the leaves are moved. The light source 110 is tuned to cause the ruby markers 118 to fluoresce in a wavelength different to that of the illuminating light. Illuminating light from the light source 110 is shown by arrow 116 in FIG. 1. When illuminated with certain wavelengths of light, ruby crystals will fluoresce in the dark red/near infrared band—nominally 695 nm. Thus, the ruby markers 118 will be illuminated by for example, a 410 nm monochromatic source 110. This will cause the ruby to fluoresce, emitting light in a variety of directions including upwards (see arrows 120 in FIG. 1 showing emitted light), and is reflected out of the path of the beam and to a camera 124.

The illumination light is filtered out by a filter, and light form the rubies is imaged. The camera 124 receives light from the rubies but not from the illumination sources 110. The camera system can create an image of the ruby markers. Each camera images the light received from each of the rubies in the field of view of that camera.

For each leaf and marker, the relative position of the florescent marker and the tip of the leaf is known. The collimation of the beam is determined as follows. The cameras send information on the light detected at the cameras to a processor (not shown in FIG. 1). At the processor the images are stitched together using known methods and are used to determine the location of each of the ruby markers. Since the relative position between the ruby marker and the tip of the leaf to which it is attached is known, the position of the tip of the leaf can be determined. The positions of the tips of the leaves of the MLC determines the edge presented to the radiation field and hence the amount of collimation of the radiation beam.

As a light source 110 is required, the camera must have an infra-red pass filter. The filter is configured to filter out light having the wavelength of the illumination light, so that light having the wavelength of the illumination light does not enter the camera. This adds additional complexity to the system.

In some instances, as shown in FIG. 1, a camera cannot be in the radiation beam since it would block the radiation and also damage the camera. Therefore, the camera 124 receiving the light from the ruby markers is positioned outside the beam to protect it from the harmful radiation. To image this light therefore, the light must be directed away from the radiation beam using mirrors 122, as shown in FIG. 1. However, in an alternative known arrangement, a camera can be positioned to directly image the light from the illuminated ruby markers.

As has been explained, fluorescent markers can use a light source in the system to illuminate the markers. The provision of a light source is an additional level of complexity in the MLC device and therefore, there is desired a solution for accurate leaf positional readout which does not require a light source to illuminate markers.

Figure 2:
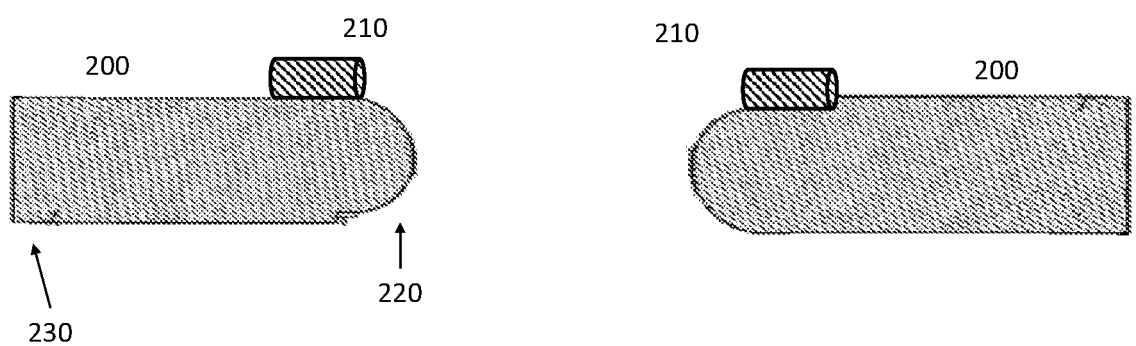
FIG. 2 shows an example a leaf according to an embodiment of the present disclosure.

FIG. 2 shows two leaves 200 of a multi-leaf collimator for a radiotherapy device. Each leaf 200 has a radioluminescent marker 210. The radioluminescent markers 210 produce low level light sources for illumination of the MLC leaves 200 and this light can be used to signpost the location of the leaves 200.

Radioluminescence is the phenomenon by which light is produced in a material by bombardment with ionizing radiation such as alpha particles, beta particles, or gamma rays. Radioluminescence occurs when an incoming particle of ionizing radiation collides with an atom or molecule, exciting an orbital electron to a higher energy level. The particle usually comes from the radioactive decay of an atom of a radioisotope, an isotope of an element which is radioactive (i.e. through alpha, beta or gamma decay). The electron then returns to its 'ground energy level' by emitting the extra energy as a photon of light. A chemical that releases light of a particular colour when struck by ionizing radiation is called a 'phosphor'. Radioluminescent marker 210 includes a radioluminescent material. In some examples, radioluminescent marker 210 includes a radioactive substance mixed with, or in proximity to, a phosphor.

In a preferred embodiment, the radioluminescent market 210 comprises tritium gas (e.g. tritium gas tubes). Tritium is a radioactive isotope of hydrogen with half-life of 12.32 years that emits very low-energy beta radiation ($\beta^-$) according to the following equation:

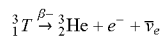

wherein, T indicates Tritium pre-beta decay, He indicates Helium-3 into which Tritium decays, $e^-$ indicates the emission of an electron and $\bar{v}_e$ indicates the emission of an anti-neutrino.

The tritium radioluminescent marker 210 is contained in a small glass container (such as a tube), coated with a phosphor on the inside. Beta particles emitted by the tritium strike the phosphor coating and cause it to fluoresce and emit light. The light is usually yellow-green colour, however, the colour of the light emitted can be varied by varying the type of phosphor. In the tube, the tritium gives off a steady stream of electrons due to the beta decay. These particles excite the phosphor, causing it to emit a low, steady glow. This produces a continuous light source. Different phosphors each have their own characteristic colour of emission and period of time during which light is emitted after excitation ceases. This makes them suitable for creating radioluminescent markers with different visible light emissions (e.g. red, orange, green, blue). Radioluminescent markers of different colours are produced by coating the lining of the gas container (i.e. tube) with different phosphors.

Tritium gas tubes are readily available and already have several practical uses (e.g. illuminating watch faces). They are produced to standard specifications with high precision and can therefore be incorporated onto an MLC leave and radiotherapy device with relative ease. Tritium gas tubes can be produced to a high level accuracy. This means they have specified dimensions, making them suitable for use in calculating the position of MLC leaves based on software calculations.

Any harmful radioactive substances are kept within the glass tube to avoid any negative impacts associated with radioactive substances. The glass tube is sealed to retain the gas within the tube. An example of the type of glass could be 'borosilicate' glass, since it is well known for having a low coefficients of thermal expansion, making it resistant to thermal shock. The tritium gas tube can be cylindrical in shape, although other possible shapes may also be used, such as a tubular (3D) or flat structures (2D). The tritium gas tube container is non-permeable to ensure that gas cannot escape.

The long half-life of tritium of 12.32 years allows it to emit a low level light source for a very long time. This ensures that the tritium marker 210 will continue to remain visible for the lifetime of the MLC and radiotherapy apparatus.

Other possible radioluminescent materials can also be used, for example radium and promethium. However, tritium is preferred due to its ideal half-life which makes it suitable for use with the required lifetime of an MLC.

As shown in FIG. 2, the radioluminescent marker 210 can be placed at the tip 220 of the leaf 200. The radioluminescent marker 210 is placed at the tip 220 but, importantly, not in the way of the intended path of the treatment radiation. This is ensures that radiation is not diffracted around the radioluminescent marker 210 in an unintended way and also ensures that the path of radiation is not obstructed, except as intended by the MLC leaves. For this reason, the radioluminescent marker 201 may be slightly set back from the edge of tip 220 of the MLC marker—as shown in FIG. 2.

Alternatively, the radioluminescent marker 210 can be placed at the tail 230 or anywhere else on the leaf. If the radioluminescent maker 210 is placed at the tail 230 of the leaf, then two cameras are needed; one to image each bank of leaves. A camera is placed at the back of each leaf bank (i.e. on the respective left and right hand sides of FIG. 2). Software used to calculate the position of the MLC leaves is calibrated according to the position of the radioluminescent marker 210 at the tip 220, tail 230 or elsewhere on the leaf 200.

Figure 3:
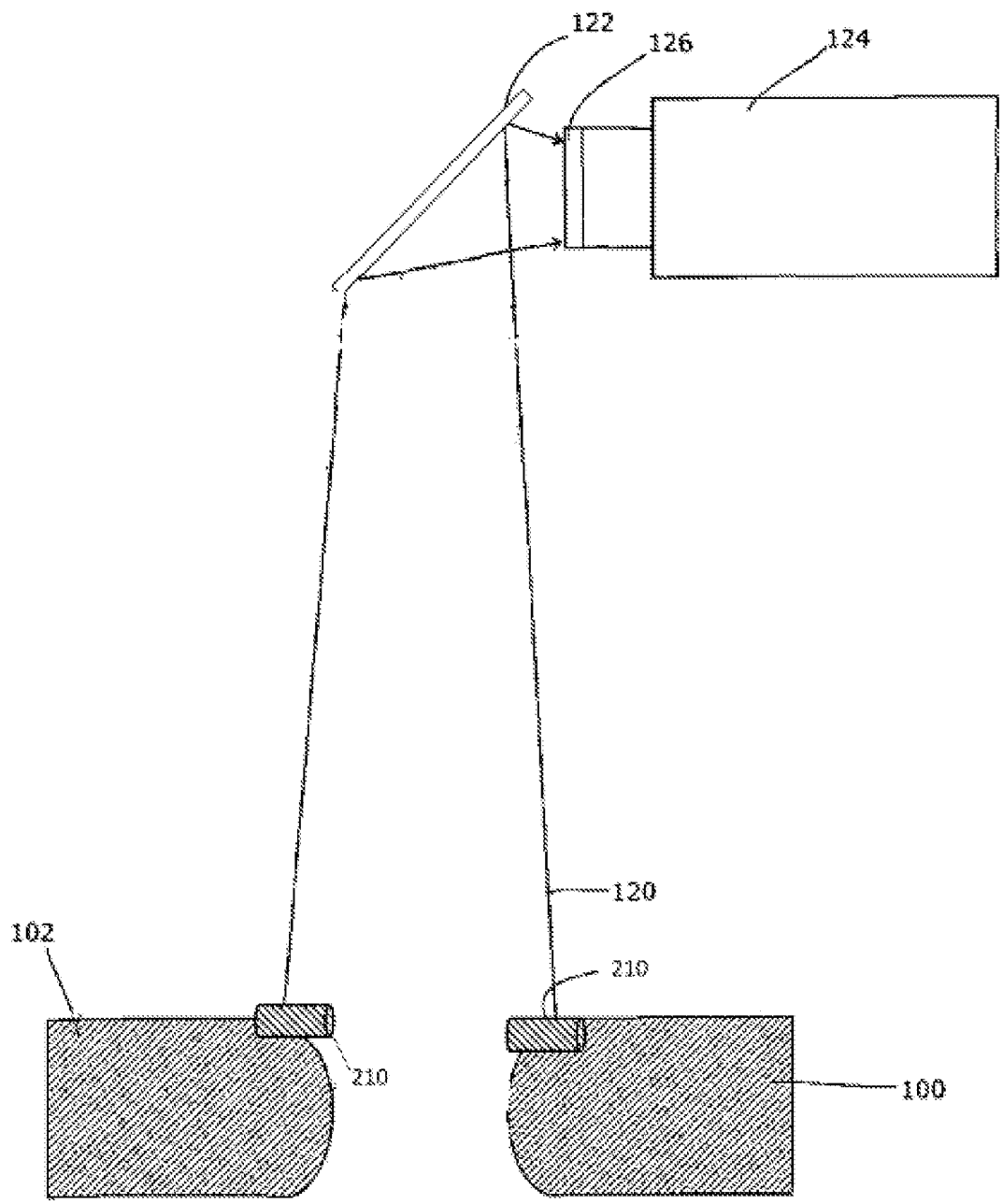
FIG. 3 shows an example a multi-leaf collimator system according to a further embodiment of the present disclosure.

FIG. 3 is a schematic cross-section of a multi-leaf collimator system including the radioluminescent markers 210. The reference numerals shown in FIG. 3 correspond to the same reference numerals used in FIG. 1. Notably, there is no light source shown in FIG. 3.

A radiation source (not shown) is configured to emit a beam of radiotherapeutic energy. The tips of the MLC leaves 100,102 project into the radiation beam to delimited (collimate) the beam. The leaves are made of, for example, tungsten which attenuates the radiation beam.

Since radioluminescent markers 210 are a light source of their own, no external light source is required to illuminate the markers, for example, in the same way that it required for ruby markers or other reflective markers (see FIG. 1). When the radioluminescent marker is a tritium gas tube, the tritium gas tube can self-illuminate due to beta decay reacting with internal surface of the gas tube to produce visible light. This provides the benefit of allowing a radiotherapy system to be created where no light source is required to illuminate markers (as shown in FIG. 3). This significantly reduces the complexity of the system.

Removing the light source is beneficial because it is common for external light sources to fail, as they are often placed directly in line-of-sight of the x-ray beam. Therefore, removing the light source allows for reduced machine downtime caused by the need to repair and replace components of the radiotherapy device. Additionally, removing the light source also allows greater freedom to place other features of the MLC including the placement of the camera to image the radioluminescent markers and any optical features, such as mirrors, that are used to obtain an accurate image of the markers. Removing the light source also removed the need to position the light source, reducing the energy requirements of the radiation head. Further, requiring fewer parts may increase the ease of assembly of the radiation head, as well as reducing the total weight of the radiation head.

Light emitted from the radioluminescent markers is imaged by a visible light camera 124. A camera 124 should not be in the radiation beam since it would block the radiation and also damage the camera 124. To image this light therefore, the light is directed away from the radiation beam using mirrors 122 as shown in FIG. 3. Unlike when ruby markers are used, no filter is required on the camera to filter out light from an illuminating light source. A camera system 124 comprising more than one camera can create an image of the radioluminescent markers 210. Each camera can image the light received from each of the radioluminescent markers 210 in the field of view of that camera to build an accurate picture of the leaves 100,102.

The collimation of the beam is determined as follows. The cameras send information on the light detected at the cameras to a processor (not shown in FIG. 3). At the processor the images are stitched together using known methods and are used to determine the location of each of the radioluminescent markers 210. For each leaf and marker, the relative position of the radioluminescent marker and the tip of the leaf is known. The positions of the tips of the leaves of the MLC, therefore, determines the edge presented to the radiation field and hence the amount of collimation of the radiation beam.

Determining the collimation of the beam is performed on a processor having a computer readable medium which, when processed by the processor, causes the processor to perform the method of determining the collimation.

The MLC leaves will typically be mounted in a frame of some sort. It will usually be advantageous for the frame itself to have one or more radioluminescent markers, preferably several so as to collectively indicate a maximum field of view of the collimator and provide a frame reference. The frame reference can be used to calibrate the camera and ensure an accurate reading.

In another embodiment (not shown) the cameras image the leaves directly. This is achieved by placing the radioluminescent markers elsewhere on the MLC leaves (i.e. the tail or elsewhere) to allow the camera to obtain a direct line-of-sight without being placed in the harmful radiation beam. By including the marker on the tail of the leaf, rather than on the tip of the leaf, the fluoresced light is emitted from a point further away from the centre of the beam. This means that it can be imaged directly by cameras which are positioned outside of the beam. Multiple cameras are required in this scenario to ensure line of sight from every radioluminescent marker on each leaf to at least one camera. In one embodiment the cameras are positioned directly above or below the leaves on each bank of leaves. The cameras may be positioned side-by-side along the width of the leaf bank. Each camera has a field of view which encompasses radioluminescent markers from a plurality of leaves. The cameras image the light emitted from the radioluminescent markers directly and the light emitted from the radioluminescent marker is not reflected or redirected by a mirror in the beam path. Since the markers are positioned at the tail end of the leaves, the cameras can be positioned outside the path of radiation and image the light emitted from the markers directly without the need for a mirror. This increases the lifetime of the cameras as they are not damaged by the radiation and also prevents the cameras interfering with the path of radiation leading to increased treatment precision.

In another embodiment, non-radiation-hard camera, such as CMOS or mobile phone type cameras, can be used to image the leaves. Such cameras have a limited life compared to a radiation hard camera but are much simpler and cheaper to produce. Such cameras could be used to image the markers on the leaves or to view the leaves directly. For example, such cameras may be positioned in or close to the path of the beam.

Each leaf of the MLC may have a unique identifier on it formed by at least one radioluminescent marker. As explained below, the unique identifier could be a radioluminescent marker that emits a unique wavelength of light compared to the other radioluminescent markers. Alternatively, the unique identifier could be a unique pattern of radioluminescent markers on each of the MLC leaves. These unique identifiers are captured by the camera to distinguish between each leaf of the MLC.

A first leaf may have a first radioluminescent marker placed on it and a second leaf may have a second radioluminescent marker placed on it. The first and second radioluminescent markers can be configured emit visible light of different wavelengths (i.e. different colours). Radioluminescent markers of different colours are produced by coating the lining of the gas container (i.e. tube) in phosphors that emit light of different wavelengths when exited by beta radiation. Therefore, the first radioluminescent marker and second radioluminescent marker comprise different phosphors.

A colour camera (visible light) can be used to image each of the first and second radioluminescent markers and distinguish between them. In a system of MLC leaves, each leaf may have a radioluminescent marker which emits light of a different wavelength. This can create a more accurate picture of the position of the MLC leaves since the camera and corresponding processor is easily able to distinguish between the different leaves of the MLC.

An alternative way to distinguish between different MLC leaves is to place a pattern of radioluminescent markers on each leaf. In this way, each leave has a unique pattern of radioluminescent markers. For example, a pattern of adjacent radioluminescent markers with unique spacing and/or size can be used. This is similar way to how different spacing and sizing is used between the black lines of a barcode. Alternatively, the pattern could be circular. The pattern can be positioned linearly along the length of the leaf or around the circumference of the leaf.

The camera can be used to image each of the different patterns on each leaf and distinguish between them. This information is delivered to the corresponding processor so that it is easily able to distinguish between the different leaves of the MLC and determine their position accordingly.

Features of the above aspects can be combined in any suitable manner. It will be understood that the above description is of specific embodiments by way of aspect only and that many modifications and alterations will be within the skilled person's reach and are intended to be covered by the scope of the appendant claims.

What is claimed is:

1. A multi-leaf collimator for a radiotherapy device, comprising:
   a first leaf comprising a first radioluminescent marker; and
   a second leaf comprising a second radioluminescent marker, wherein the first radioluminescent marker and the second radioluminescent marker emit visible light of different wavelengths.

2. The multi-leaf collimator according to claim 1, wherein each of the leaves of the multi-leaf collimator includes at least one radioluminescent marker.

3. The multi-leaf collimator according to claim 1, wherein at least one leaf of the multi-leaf collimator includes a plurality of radioluminescent markers.

4. The multi-leaf collimator according to claim 1, wherein the first radioluminescent marker and the second radioluminescent marker each comprise a different phosphor.

5. The multi-leaf collimator according to claim 1, wherein each particular leaf of the multi-leaf collimator includes a particular radioluminescent marker that emits visible light of a wavelength different from another particular radioluminescent marker included on another particular leaf.

6. The multi-leaf collimator according to claim 1 wherein the leaves are mounted on a frame, and wherein the frame includes at least one radioluminescent marker.

7. The multi-leaf collimator according to claim 6, wherein the frame includes a plurality of radioluminescent markers that collectively indicate a maximum field of view of the multi-leaf collimator.

8. The multi-leaf collimator according to claim 1, wherein at least one of the first radioluminescent marker or the second radioluminescent marker is arranged to emit electrons through beta decay.

9. The multi-leaf collimator according to claim 1, wherein at least one of the first radioluminescent marker or the second radioluminescent marker comprises a tritium gas tube.

10. The multi-leaf collimator according to claim 1, wherein at least one of: i) the first radioluminescent marker is positioned at a tip of the first leaf or a tail end of the first leaf, or ii) the second radioluminescent marker is positioned at a tip of the second leaf or at a tail end of the second leaf.

11. The multi-leaf collimator according to claim 1, wherein at least one of the first radioluminescent marker or the second radioluminescent marker is cylindrical.

12. A radiotherapy device comprising a multi-leaf collimator comprising:
    a plurality of leaves, wherein at least one leaf includes at least one radioluminescent marker; and
    a camera arranged to view and capture visible light emitted by the at least one radioluminescent marker, wherein:
      a first leaf comprises a first radioluminescent marker and a second leaf comprises a second radioluminescent marker; and
      the first radioluminescent marker and the second radioluminescent marker emit visible light of different wavelengths.

13. The radiotherapy device according to claim 12, wherein the camera is a coloured camera arranged to capture and distinguishing between the visible light of different wavelengths.

14. The radiotherapy device according to claim 12, wherein the camera is arranged to directly view light emitted by or reflected from the at least one radioluminescent marker.

15. The radiotherapy device according to claim 12, wherein the camera is arranged with a line-of-sight path to the at least one radioluminescent marker.

* * * * *